(12) United States Patent
Sparrow et al.

(10) Patent No.: US 8,006,688 B1
(45) Date of Patent: Aug. 30, 2011

(54) FOOD STEAMING APPARATUS

(75) Inventors: John R. Sparrow, Columbia, SC (US); Grady H. Davenport, Jr., Jamesville, NC (US); Robert C. Sexton, Jr., Jamesville, NC (US)

(73) Assignee: Esco, LLC, Greer, SC (US)

( * ) Notice: Subject to any disclaimer, the term of this patent is extended or adjusted under 35 U.S.C. 154(b) by 1172 days.

(21) Appl. No.: 11/098,913

(22) Filed: Apr. 4, 2005

(51) Int. Cl.
*F24B 9/04* (2006.01)

(52) U.S. Cl. .................. 126/369.2; 126/5; 126/362.1

(58) Field of Classification Search ........... 126/369.2, 126/369.3, 33, 5, 20, 369; 219/401
See application file for complete search history.

(56) References Cited

U.S. PATENT DOCUMENTS

| | | | | |
|---|---|---|---|---|
| 74,419 | A * | 2/1868 | Poole | 126/369.3 |
| 1,341,353 | A * | 5/1920 | Belvin | 99/359 |
| 1,433,157 | A * | 10/1922 | Schwimmer | 126/33 |
| 1,642,706 | A | 4/1926 | White | |
| 3,814,901 | A * | 6/1974 | Morhack | 219/401 |
| 5,411,753 | A | 5/1995 | Tippmann | |
| 5,640,946 | A * | 6/1997 | Oslin | 126/20 |
| 5,713,346 | A * | 2/1998 | Kuechler | 126/299 D |
| 5,813,321 | A | 9/1998 | Bourgeois | |
| 5,968,574 | A * | 10/1999 | Sann | 126/20 |
| 5,970,852 | A | 10/1999 | Bourgeois | |

OTHER PUBLICATIONS

Cleveland Market Forge Industries Inc. From Webpage http://www.banner-sales.com/kettles.html dated Jul. 26, 2002.
Direct Steam Kettle Model OC-28; sales flyer from Legion Industries, Inc.
Direct Steam Kettle Model OC-20; sales flyiner from Legion Industries, Inc.
Seafood Steamer. webpage from http://www.njc-usa.com/oyster dated Jul. 26, 2002.

* cited by examiner

*Primary Examiner* — Steven B McAllister
*Assistant Examiner* — Sarah Suereth
(74) *Attorney, Agent, or Firm* — Michael A. Mann; Nexsen Pruet, LLC

(57) ABSTRACT

A steamer cooks individual serving portions of food such as oysters and shellfish by direct contact with steam at atmospheric pressure. The steamer uses a boiler and valved piping system including a manifold to deliver steam on demand to each one of plural cooking stations. Each station has a container such as a bucket that receives the steam through a nozzle extending through a hole in the bucket's bottom. The user controls the flow of steam to each cooking station independently, thus allowing multiple serving portions of food to be steamed independently of each other, that is, separately, in parallel, and without regard for the start times and end times of the other serving portions. Preferably individual steam valves, timers and on/off indicators allow the user complete control over cooking times at each cooking station. The steam exiting the buckets and condensate are collected and carried off.

20 Claims, 3 Drawing Sheets

FOOD STEAMING APPARATUS

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING, A TABLE, OR A COMPUTER PROGRAM LISTING COMPACT DISK APPENDIX

Not Applicable.

BACKGROUND OF THE INVENTION

The present invention is a cooking device and, more particularly, a cooking device that uses steam for cooking. When compared to other forms of cooking, direct steam cooking, where the steam cooks by directly contacting the food, provides certain advantages including (1) reduced physical break-up of the food because the food is not generally disturbed during cooking, (2) reduced preparation time because of reduced handling and faster cooking time, (3) relatively constant temperature, even cooking, and (4) better retention of water soluble vitamins such as B and C.

The recognition of the benefits of steam cooking is not new. In fact, the ancient Chinese are known to have held bamboo containers over pots of boiling water in order to steam vegetables and fish. In the seventeenth century, the steam pressure cooker was developed in France and has since enjoyed renewed popularity in the past decade. Indeed, cooking with steam using the venerable double boiler (a metal strainer fitting on top of a pot of boiling water) remains a popular way to prepare meats, fish, and vegetables.

In modern times, people also tended to eat in restaurants more often. Busy schedules and a greater number of dual income households have increased interest in rapidly prepared food that is both healthy and inexpensive. In some cases, cooking with steam may offer an excellent way to achieve both objectives.

Unfortunately, direct cooking with steam remains time-consuming and cumbersome for quick-service convenience restaurants and many traditional restaurants. Little technological progress has been made in direct steam cooking beyond the double-boiler approach, where the user boils a pot of water, and then starts the cooking process by setting the food in a strainer atop the pot. The user stops the cooking process by physically removing the food from the steam source. While simple in terms of equipment needed, this process is inefficient because the user must maintain a pot of boiling or near-boiling water for the occasional order, and must carefully monitor the steaming food in order to prevent overcooking, which is easy to do with direct steam cooking. Also, the double boiler presents a potential safety hazard because of the possibility of direct contact with the boiling water and steam. In a hectic restaurant kitchen, such a control problem prevents direct contact steam cooking from being used for anything but expensive, specialty dishes.

In contrast, indirect steam cookers have been refined and are quite common in the restaurant environment. A typical indirect steam cooker is shown by the White ('706) reference that has multiple, manually controlled steam circuits that warm various pots on a table. The system heats food indirectly in that the steam heats pots containing food rather that by direct contact between the steam and the food. While the White reference dates from 1927, modern equipment based on this idea is available in various forms such as buffet warmers, chaffing dishes and steam jacket kettle cookers. The idea can be seen in both individual cookers and in plural systems with more than one pot. Steam jacket cookers come in a wide range of sizes adapted to different types of food. While the indirect cooking method is efficient for some applications, it does not provide the same health benefits of direct steam cooking.

Other inventors have responded to these problems by finding better ways to cook food by direct contact with steam. For example, Bourgeois ('852 & '321) is typical of this development in which a gas burner is used to heat a pot that is partially filled with water to generate steam. Inside the pot sits a removable wire rack on which the user can place food items to be steamed. The cooked food is then withdrawn from the pot by removing the rack. The cooking is self-contained and rapid but the drawbacks are (1) larger-sized cooking equipment because of the presence of boiling water in the same vessel where the food is steamed, (2) food must be transferred from a rack to another serving dish because the wire rack is not suitable for customer service, and (3) the system contains the same limitations as a double-boiler, since the user controls the cooking of the food by manually removing the rack and the food from the cooker when it is done.

Although equipment is commonly available for commercial seafood processors (e.g. canneries) to cook seafood at high, steady production rates using direct contact steam, such equipment is not suited to resolve the problems of cooking with direct steam in a restaurant environment. The high production rate systems use conveyor belts to move the food past steam jets to achieve even cooking, and therefore must receive a continuous supply of raw food. Consequently, they do not allow for convenient segregation of food into individual serving portions, and require a large amount of energy even when a small volume of food is to be cooked. These systems are often complex and require a large amount of floor space not commonly found in small restaurants and taverns.

Therefore the need exists for a direct steaming system that enables a user to cook small batches of food rapidly and independently, with a minimum amount of labor and energy, with an economical equipment arrangement while still retaining the health benefits of direct steam cooking.

SUMMARY OF THE INVENTION

According to its major aspects and broadly stated, the present invention is a steamer that cooks food such as oysters and shellfish by direct contact with steam at atmospheric pressure. The steamer uses a central steam source to deliver steam on demand to each one of plural containers when needed and as needed. The user controls the flow of steam to each cooking station independently, thus allowing multiple serving portions of food to be steamed independently of each other, that is, separately, in parallel, and without regard for the start times and end times of the other serving portions. The food is steamed in open-topped containers, or buckets, which are formed to allow the upward flow of steam from nozzles extending through holes in their bottoms. The food may be retained in the buckets for serving or may be transferred to other containers suitable for serving.

Each cooking station may be operated independently of any other cooking station on the frame. Thus different sized portions, or batches, are prepared separately on each station and the cooking cycles, e.g. start and stop time, may be run independently and in parallel. For example, a user could elect to prepare one batch of six oysters at time 1 in a bucket at station A. The same user could then elect to prepare another batch of 12 oysters at time 2 in a bucket at station B. The six-oyster batch would then be ready at a different time than the 12-oyster batch. Presumably, each batch would correspond to a customer order. In addition, a user could elect to set up many batches, each on a different cooking station, and then start all the cooking stations at the same time. All the batches would then be steamed in parallel and completed together, ready for a large party or dinner rush. Or, the user could elect to stagger the start times of each cooking station to achieve a sequential completion time for the food batches.

The container, or bucket, in which the food is prepared offers the user an easier way to set up and serve steamed food than prior art. The food to be steamed is simply loaded into the bucket, which is then placed directly over the steam nozzle for steaming in the bucket. When the steaming process is complete, the user may simply remove the bucket from the steam nozzle and serve the bucket directly to a customer or transfer the food from the bucket to a serving dish. There is no elaborate set up for cooking or removal.

A major advantage of the present invention is that it allows a user to prepare different individual serving portions of food independently from one another yet in parallel and without regard to the start times and end times of the different portions. One serving portion does not have to wait on a previous one to be finished before steaming can commence; it is simply put into a container and placed on another station.

Another advantage of the present invention is that the equipment layout is flexible, allowing the user to adapt the steamer to individual restaurant needs. A large restaurant can have more stations than a smaller restaurant. The arrangement of stations can fit the kitchen layout, with plural layers of stations if desired.

Another advantage of the present invention is its relative energy efficiency. There are, for example, individual steam valves for each station. To start the flow of steam, the valve is opened for that station; to stop the flow, the valve is closed. Steam for only that station is used. No steam is wasted. One properly sized boiler provides steam for numerous stations, rather than using a large pot of water kept simmering on a stove for one batch of food items at a time.

Another advantage of the present invention is simple operation. Training time is minimal: there is one valve to operate and a timer. The timer can be simplified so that the user needs to turn it to a mark that indicates the correct cooking time for the type of food and quantity of food being cooked.

These and other features and their advantages will be apparent to those skilled in the art of design and fabrication of steam cooking appliances from a careful reading of the Detailed Description of The Preferred Embodiments accompanied by the Drawings.

BRIEF DESCRIPTION OF THE DRAWINGS

In the figures.

DETAILED DESCRIPTION OF THE PREFERRED EMBODIMENTS

Figure 1:
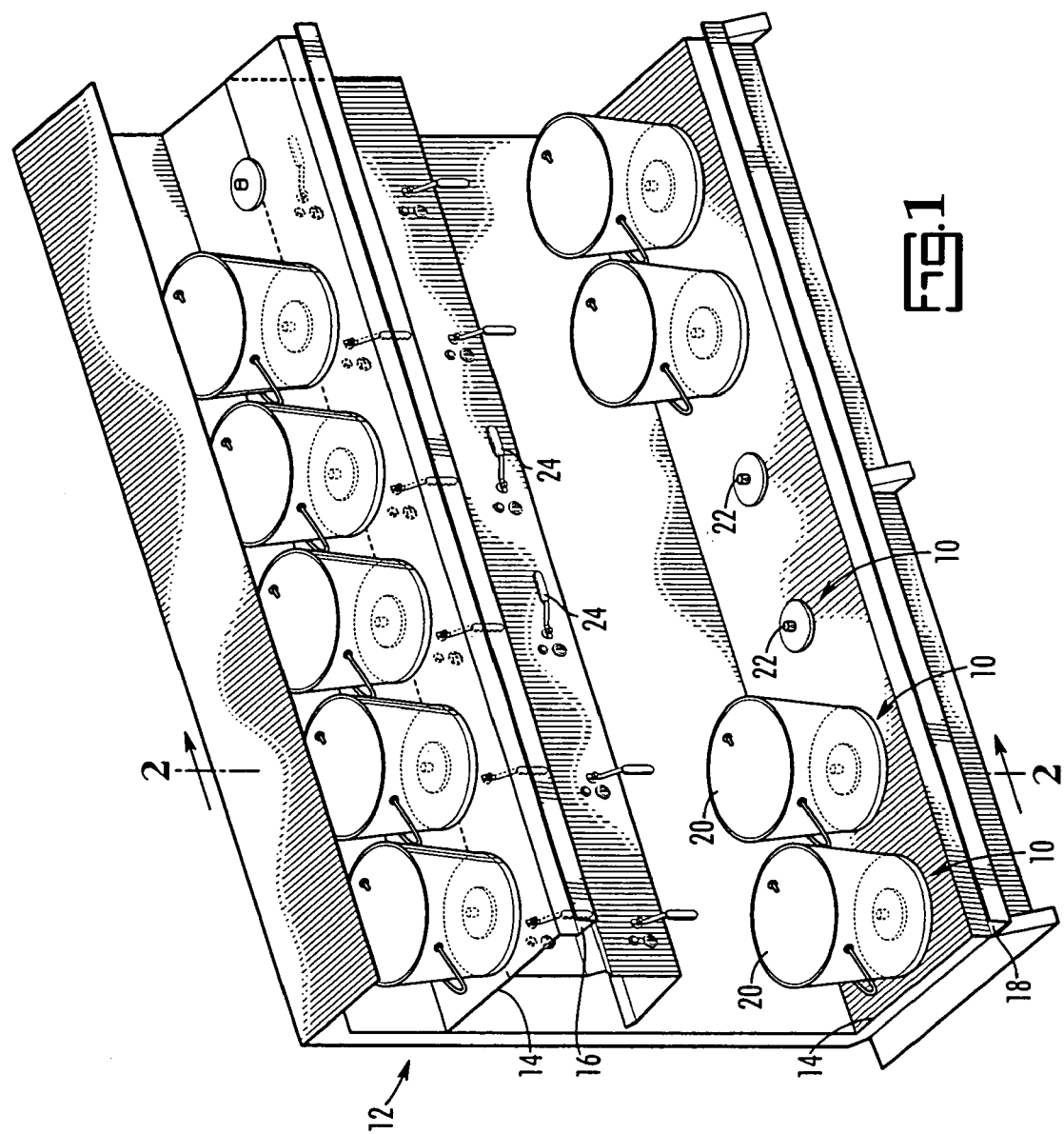
FIG. 1 is a diagram of a perspective view of a multiple cooking station frame showing buckets, steam nozzles, and valves according to a preferred embodiment of the invention.

Referring to FIGS. 1 through 4, cooking stations 10 are shown carried by frame 12. Frame 12 is shown having two shelves 14. Each station 12 permits an order of food, perhaps an individual serving, to be cooked independently of any food being cooked at any other station 12. Independently means that multiple, but not all, stations 12 may be in use at any moment, with different start times and different end times, some of which stations may be operated in a coordinated, orchestrated way and other stations may be operated without regard to each other, as needed to meet the demands of different customers.

Figure 2:
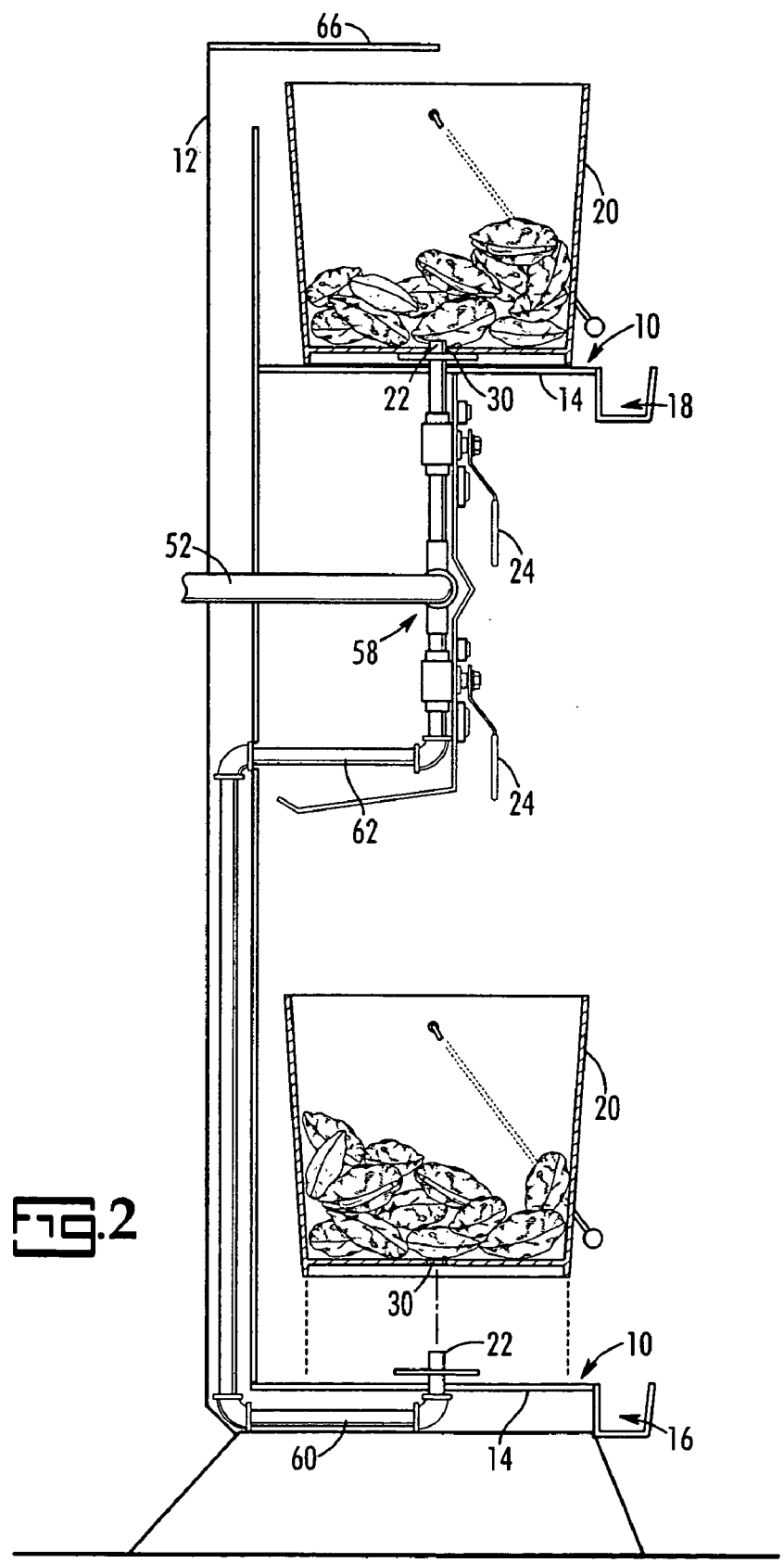
FIG. 2 is a cross-section of a typical cooking station, showing a bucket, steam nozzle, valve, and food according to a preferred embodiment of the invention.

Frame 12 may be configured in other ways, of course, besides that shown in FIGS. 1 and 2. For example, an additional shelf 14 may be provided, frame 12 may have cooking stations on two back-to-back sides, or frame 12 may be curved or formed to fit around or in a corner of a kitchen to meet the needs of the space where it is installed.

Each shelf 14 has a gutter 16, 18, designed to collect condensate from the steaming process and carry it to a central drain, as will be described below. The frame 12 is preferably fabricated of easily-cleaned, stain-resistant or corrosion-resistant materials, such as stainless steel.

Each cooking station 12 includes a bucket 20, a steam nozzle 22, and a steam valve 24. Each bucket 20 has a hole 30 formed in its bottom dimensioned to receive steam nozzle 22. Steam nozzle 24 preferably issues steam toward the sides of bucket 20. In addition, in a preferred embodiment, each cooking station 12 can be controlled using a timer 34 and may have an on/off indicator 38.

When a serving portion of food is to be cooked, the food is placed in bucket 20 and positioned on a cooking station 12 on shelf 14 with steam nozzle 22 extending through hole 30. When steam valve 24 is moved from the closed position to the "open" position, steam will issue from steam nozzle 24 into bucket 20, there by commencing the cooking process. When the requisite time has passed to cook food to the desired state, steam valve 24 is moved to the "closed" position, thereby stopping the flow of steam from nozzle 22. Bucket 10 can then be removed and the food item served in the bucket, as in the case of oysters, or transferred to a serving dish.

Each cooking station 10 can also be controlled in a preferred embodiment in a variety of ways in addition to the manual operation of steam valve 24. The degree of done-ness is a function of time. In a preferred embodiment, the cooking time can be set using timer 34 so that, when the desired time from the start of cooking has elapsed, a user will know to shut off steam valve 24. In addition, on/off indicators 42, 44, can be used to indicate that the cooking time has elapsed (see FIG. 4). Fore example, the user may move steam valve 24 to the "open" position, set the timer to five minutes or to a mark on frame 12 that corresponds to "oysters, ½ peck." "On" indicator button 42 will glow green and "off" indicator button 44 will be dark. Once timer has counted down five minutes (in this example), "on" indicator button 42 will be dark and "off" indicator button 44 will glow red. User then shuts off steam valve 24.

In other embodiments of the present steamer, other control approaches may be taken, such as operatively connecting steam valve 24 with timer 34 so that when timer 34 is switched on, valve 24 opens, and when timer 34 shuts off, valve 24 shuts off. These are well-known tradeoffs in flexibility, simplicity and lower cost versus the convenience of automation and certainty.

The source for steam for cooking is a boiler, preferably an insulated, high-efficiency boiler 50. Boiler 50 is typically a heat exchanger that uses a heat source such as an electric heating element or burner. Steam is delivered from boiler 50 to steam nozzles 24 via a piping system. Steam is permitted to exit boiler 50 via a main steam pipe 52 when main steam valve 54 is opened. In the present preferred embodiment, with two shelves 14, steam is divided at a manifold 58 to individual cooking station steam lines 60, 62 for the two shelves. Manifold 58 has a steam supply side and a nozzle side. Cooking station steam lines 60, 62 and steam valves 24 are on nozzle side, main steam pipe 52 and main steam valve 54 are on steam supply side. Each steam line 60, 62, has its own steam valve 24.

Figure 3:
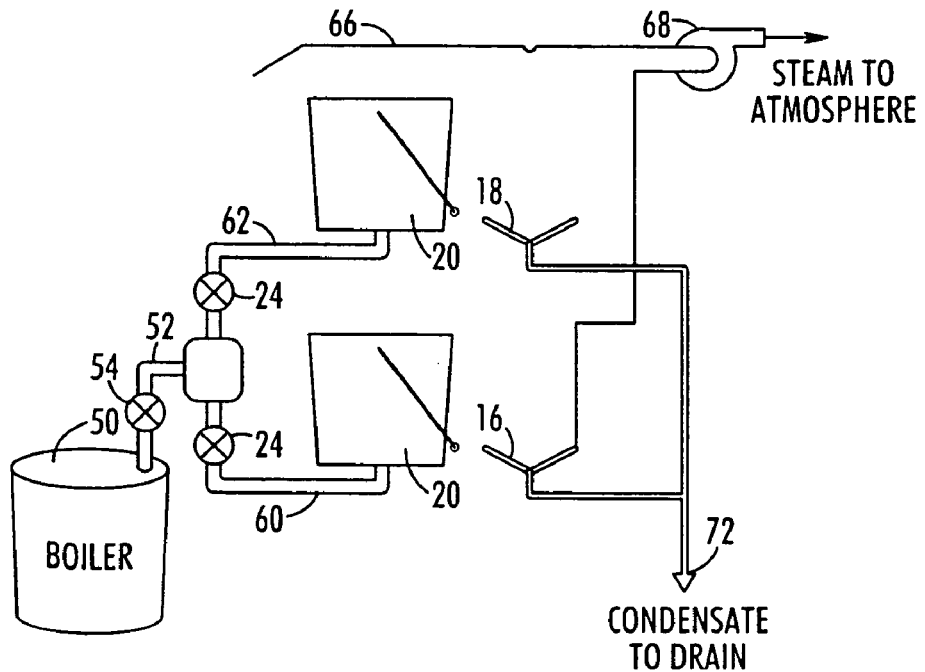
FIG. 3 is a schematic diagram of a multiple cooking station system according to a preferred embodiment of the invention.
Figure 4:
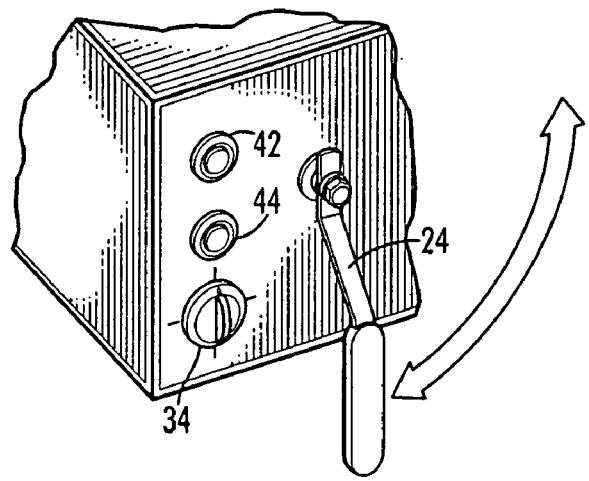
FIG. 4 is a diagram of a typical cooking station control means showing start button, indicator light, and timer according to a preferred embodiment of the invention.

Once steam exits bucket 20, it rises quickly and contacts hoods 64, 66, where a pump 68 gathers it and pumps it to the atmosphere (see FIG. 3). Condensate is collected in gutters 16, 18 and carried safely to a central point and then to floor drain 72 or collected for recycling in boiler 50.

For safety of users, a heat shield 76 is carried by frame 12 to cover steam lines and protect users from accidentally bumping against the hot surfaces of steam lines. Heat shield 76 also provides a surface on which to mount timer 34 and indicator 38 as well as the handle of steam valve 24.

It will be apparent to those skilled in the art of design and fabrication of steam cooking appliances that many modifications and substitutions can be made to the foregoing described embodiments without departing from the spirit and scope of the present invention, defined by the appended claims.

What is claimed is:

1. A steamer for cooking food, said steamer comprising:
    (a) a frame;
    (b) a bucket having a bottom with a hole formed therein;
    (c) a source of steam; and
    (d) a piping system having a nozzle in operative connection with said source of steam, said frame being adapted to carry said nozzle and said bucket so that when said bucket is placed over said nozzle without attaching said bucket to said frame and said nozzle, said nozzle fitting through said hole, and, when said nozzle delivers said steam from said source of steam into said bucket while food is in said bucket, said food contained in said bucket is cooked by direct contact with said steam from said nozzle, and, after said food is cooked, said bucket can be lifted from said frame.

2. The steamer as recited in claim 1, wherein said piping system further comprises a valve having an open position and a closed position.

3. The steamer as recited in claim 2, wherein said valve further comprises a timer.

4. The steamer as recited in claim 1, wherein said source of steam further comprises a heat exchanger.

5. The steamer as recited in claim 1, wherein said source of steam further comprises a boiler.

6. The steamer as recited in claim 1, wherein said frame further comprises a shelf adapted to carry said nozzle so that when said bucket is placed on said shelf and over said nozzle, said shelf will support said bucket during said steaming process.

7. The steamer as recited in claim 1, wherein said frame further comprises a sloped gutter adapted to collect and route condensate produced from said steaming process to a central drain.

8. The steamer as recited in claim 1, wherein said frame further comprises a hood adapted to collect steam exiting said bucket.

9. The steamer as recited in claim 1, wherein said frame further comprises an exhaust pump adapted to discharge said collected steam to the atmosphere.

10. The steamer as recited in claim 1, wherein said frame further comprises at least one shield adapted to protect a user from said piping.

11. The steamer as recited in claim 1, wherein said piping system further comprises a means for timing the delivery of steam, said timing means carried by said frame.

12. The steamer as recited in claim 11, wherein said timing means further comprises:
    (a) a cooking cycle start indicator;
    (b) a cooking cycle stop indicator; and
    (c) means for selecting an interval of time for steaming.

13. A steamer for cooking food, said steamer comprising:
    (a) a frame;
    (b) at least one bucket having a bottom with at least one hole formed therein;
    (c) a source of steam; and
    (d) a piping system having at least one nozzle in fluid connection with said source, said frame being adapted to carry said at least one nozzle and said at least one bucket so that when said at least one bucket is placed over said at least one nozzle, said nozzle fitting through said hole of said bucket without attaching said bucket to said frame and said nozzle, and, when said at least one nozzle delivers said steam into said at least one bucket from said source of steam and food is in said bucket, said food contained in said at least one bucket is cooked by direct contact with said steam, and, after said food is cooked, said at least one bucket can be lifted from said frame.

14. The steamer as recited in claim 13, wherein said frame further comprises plural shelves adapted to carry said at least one nozzle and said at least one bucket.

15. The steamer as recited in claim 13, wherein said frame further comprises a sloped gutter adapted to collect condensate produced from said steaming process.

16. The steamer as recited in claim 13, wherein said frame further comprises a hood adapted to collect steam from said at least one bucket.

17. The steamer as recited in claim 13, wherein said frame further comprises an exhaust pump adapted to discharge said collected steam to the atmosphere.

18. The steamer as recited in claim 13, wherein said frame further comprises at least one shield adapted to protect a user from said piping system.

19. The steamer as recited in claim 13, wherein said piping system further comprises:
    (a) a manifold having a steam source side and a nozzle side;
    (b) a main steam valve in fluid connection with said manifold and said steam source; and
    (c) at least one valve in fluid connection with said manifold and said at least one nozzle so that when said at least one valve is opened and said main steam valve is opened, said at least one nozzle receives steam from said steam source.

20. The steamer as recited in claim 13, wherein said piping system further comprises at least one valve having an open position and a closed position.

* * * * *